Patented Nov. 21, 1933

1,936,123

UNITED STATES PATENT OFFICE 1,936,123

PRESERVATION OF ANIMAL AND VEGETABLE SUBSTANCES

Richard Willstätter, Munich, Germany

No Drawing. Application December 27, 1929, Serial No. 417,004, and in Germany January 21, 1929

7 Claims. (Cl. 99—9)

This invention relates to a process for preserving animal and vegetable substances, such as meat, fish, eggs, animal skins, animal organs, such as glands and the like, fruits, vegetables etc. wherein hydrocyanic acid is employed as the preserving agent.

The bactericidal action of hydrocyanic acid has been known for many years. Various attempts have also already been made to utilize this property for preserving processes. Thus, for example, fresh fruits have been treated before export with hydrocyanic acid gas in order to protect them from mould and putrefaction. Experience has, however, shown that fruits are easily affected by the high concentrations of hydrocyanic acid required and that a single treatment of this kind with hydrocyanic acid gas, is not sufficient to ensure preservation for any length of time, as the spores of mold fungi cannot be destroyed in this manner.

In contradistinction to the known single treatment with hydrocyanic gas the present invention is based on the principle of preserving animal and vegetable substances as well as food stuffs, such as meat, fruits and the like, by subjecting the same to the continuous action of hydrocyanic acid in comparatively small concentrations.

It has been found, according to this invention, that permanent preservation can, in general, be ensured, by storing the substances or products to be treated, for example, meat, in closed chambers, the free gas space of which is constantly maintained at a hydrocyanic acid concentration of at least 0.004% by volume (50 mg. of hydrocyanic acid per cubic metre of free space). The actual hydrocyanic acid concentration to be maintained is dependent on the conditions for the time being, such as the nature of the substances to be preserved (meat, fats, fruits and the like), the duration of preservation, temperature etc. Generally it has proved preferable to maintain the hydrocyanic acid concentration in the free (uncharged) space during the process of preservation between about 0.004 and 0.01, especially between 0.006 and 0.008% by volume.

The quantity of hydrocyanic acid to be employed depends also inter alia upon the water content of the substances or products to be preserved. Products containing more water require larger quantities of hydrocyanic acid.

The temperature is also of importance. It has in general proved to be advantageous to maintain the temperature below 20° C. for example at about 15° C. or below, preferably at from 6 to 10° C.

In carrying out the process according to this invention not only have the foregoing conditions as well as the size of the chamber to be considered, but also all the other conditions particularly the extent to which the chamber has been more or less closely packed with the material under treatment.

The products to be preserved, such as portions of meat, may, for example, be hung in the chamber in such a way that the hydrocyanic acid has free access to the surface of the individual portions. The surprising fact has been found that meat and the like substances can be successfully preserved with the aid of hydrocyanic acid even when the portions of meat are closely packed one above the other in the chamber. The recognition of this fact offers inter alia the great advantage that a saving in space is effected and the consumption of hydrocyanic acid lessened.

After loading the chamber hydrocyanic acid is introduced in an amount sufficient for preservation. This may be effected, for example, by passing in hydrocyanic acid gas or by passing a current of inert gases, for example air, loaded with hydrocyanic acid, into or through the chamber or, alternatively, by introducing mixtures of substances, containing hydrocyanic acid, or compounds, which are capable of yielding hydrocyanic acid. Mixtures of granular kieselguhr or the like with liquid hydrocyanic acid or, for example, compounds, such as potassium cyanide, alkaline earth cyanids, addition compounds of hydrocyanic acid with metal chlorides, such as iron chloride, aluminium chloride etc. may be employed as hydrocyanic acid-yielding substances.

If a fixed quantity of hydrocyanic acid is fed into the chambers containing the vegetable or animal products, the hydrocyanic acid concentration in the chamber continuously decreases owing to the absorption and decomposition of the hydrocyanic acid. To overcome this circumstance the following three different procedures may be adopted according to this invention for maintaining a sufficient hydrocyanic acid concentration in the preserving chamber.

1. The total quantity of hydrocyanic acid required during the whole process of preservation may be introduced at the start.

2. The necessary quantity of hydrocyanic acid may be introduced in separate portions during the process of preservation.

3. The hydrocyanic acid may be continuously fed into the chamber during the whole course of the process of preservation.

When employing the total quantity of hydrocyanic acid at the start such a quantity has to be taken that the concentration of hydrocyanic acid during the process of preservation does not fall below the required minimum concentration. Considerably higher concentrations should, therefore, be employed at first.

When large quantities of meat and other products have to be preserved for a fairly long time, for example, for more than 14 days, it has, in general, proved advisable to employ, during the whole process of preservation, more than 20 mg., preferably 25–100 mg., of hydrocyanic acid for each kg. of the material. The initial concentration of the hydrocyanic acid in the free space, will in this case have to be greater than that necessary for effecting preservation, for example 100–1000 mg. of hydrocyanic acid per cubic metre.

When the gradually decreasing concentration of hydrocyanic acid in the free space sinks considerably below 50 mg. per cubic metre this concentration is, in general, no longer sufficient. Care has, therefore, to be taken, particularly when carrying out preservation processes of long duration, that the concentration of hydrocyanic acid does, in general, not, or not for long, fall below the limiting value of 50 mg.=0.004 per cent by volume. If the free space is comparatively small as compared with the packed space, it is advisable to maintain the hydrocyanic acid concentration above the aforesaid limit. Instead of introducing the total quantity of hydrocyanic acid at once it is preferable to introduce, for example, every 8 to 14 days, aliquot portions of the same, for example, 10–20 mg. of hydrocyanic acid per kg. of material.

The third method of introducing the hydrocyanic acid offers special advantages. One method of operation, for example, in order to ensure that only a very small hydrocyanic acid concentration exists at any time in the storage chamber, is to pass inert gases, for example air, charged with suitable quantities of hydrocyanic acid continuously through the storage chamber. In this case, also, it has in general proved advisable so to regulate the hydrocyanic acid content of the air that about 50 mg. (=0.004% by volume) are present in 1 cubic metre of the empty space. In actual practice the hydrocyanic acid concentration is preferably maintained somewhat higher, for example at 0.006 to 0.008% by volume (=75 to 100 mg. of hydrocyanic acid per cubic metre of air.)

The process according to this invention may be practically carried into effect by circulating an air current, charged with the relatively small quantities of hydrocyanic acid, in a cycle through the storage chamber, care being taken to ensure that the hydrocyanic acid content is maintained at the desired concentration or within the desired limits. The air may be passed through the storage chamber, for example, with the aid of a pump, the air leaving the storage chamber being continuously again adjusted in a regenerating chamber to the desired hydrocyanic acid concentration and the air then passed back again from the regenerating chamber into the storage chamber. The speed of the air current is preferably so regulated that the air leaving the storage chamber does not contain substantially less than 50 mg. of hydrocyanic acid per cubic metre. Finally steps should be taken to ensure that the air flushes the whole of the interior of the storage chamber as uniformly as possible. If desired the air may also be passed in different directions through the storage chamber, or, for example, first in one direction and then in the opposite direction.

The regeneration chamber may, for example, take the form of a scrubbing tower, in which aqueous hydrocyanic acid of such a temperature and such a concentration flows in a counter-direction to the circulating air that the air drawn off possesses the desired hydrocyanic acid-partial pressure. The scrubbing liquid must in this case be continuously maintained at the necessary hydrocyanic acid concentration. This may be automatically effected. The hydrocyanic acid-containing air current may also be saturated with water vapour at about the temperature corresponding to that of the storage chamber, so that the air current does not appreciably alter the natural moisture content of the products to be preserved, for example, meat. Another method of procedure is to combine the process of preservation with a more or less extensive water removal from the products. This may for example, be effected by maintaining the moisture content of the air before its introduction into the chamber so low that the air leaving the chamber has a higher moisture content.

It is also possible to combine a cooling action with the hypdrocyanic acid preserving process, for example by cooling the air current to a more or less considerable degree before its introduction into the storage chamber.

One method of introducing constant quantities of hydrocyanic acid into the storage chamber is, for example, automatically to adjust the fresh air current by known methods to a fixed carbon dioxide content, equivalent to the hydrocyanic acid concentration to be employed. By passing the air current over cyanogen compounds, which are decomposed by carbon dioxide, such as alkaline cyanides, the air current loses carbon dioxide and becomes charged with the equivalent quantity of hydrocyanic acid. Atmospheric air may also, for example, be passed over cyanides and the resulting hydrocyanic acid-containing air current be thereafter mixed with a pure air current in order to adjust it to the necessary hydrocyanic acid concentration. When operating in this manner as well as at the end of the preserving process the air current leaving the storage chamber can be freed from the hydrocyanic acid still contained therein, for example with the aid of adsorption agents, such as alkalies or active carbons, silica gel and the like. The hydrocyanic acid can be recovered from the latter and be again employed.

The process according to this invention can, for example, also be carried out by periodically effecting the introduction or removal of the air charged with hydrocyanic acid instead of continuously passing hydrocyanic acid through.

It has been found that the continuous presence of hydrocyanic acid in comparatively low concentrations, leads to excellent results with regard to the preservation of the various substances, particularly food stuffs, without unfavourable secondary reactions taking place. This method further has particular advantages, for example, in that desired processes, such as naturing processes, are not interrupted and in that valuable constituents of the substances under treatment, such as vitamines, hormones and the like, are not damaged. The method of operating with a constant low hydrocyanic acid concentration, for example by passing an air current charged with suitable quantities of hydrocyanic acid through the storage chamber also offers the particular advantage, that, owing to the low concentration, the treated goods only take up very small quantities of hydrocyanic acid, for example quantities, which in themselves are unharmful or which can be comparatively easily again removed. Furthermore men and animals are not exposed to any danger when operating with these very small hydrocyanic acid concentrations.

If desired, stabilizers may be added to the hydrocyanic acid employed. When employing irritant substances as indicators of the hydrocyanic acid, substances, which might have a detrimental effect on the material under treatment, for example with regard to taste, must be avoided. It has proved to be advisable to exclude as far as possible and, if necessary to remove from the storage chambers substances, such as water and alkalies, which are capable of absorbing or destroying hydrocyanic acid. Rusted iron or iron which has commenced to rust has also proved to be detrimental. It is advisable, therefore, to avoid walls, apparatus or supports made of unprotected iron. If it is desired to preserve substances, which may be subject to internal decomposition, such as not specially selected fruit, there are preferably previously prepared by removing therefrom constituents, which are liable to have disturbing actions of the aforesaid kind, before introducing the same into the preserving chamber. Substances containing a large amount of water, such as glands, can, if necessary, be subjected to a previous treatment, for example, pressure or dehydration.

The storage chambers, which must, of course, be capable of being hermetically sealed, are preferably so constructed that the air, after the completion of the preserving process, can be easily replaced by fresh air. This is effected when discharging the preserving chamber, by suction or by forcing in fresh air under pressure or by merely ventilating. The hydrocyanic acid may be again recovered from the air leaving the chamber in the manner described above for the hydrocyanic acid-containing air current leaving the storage chamber.

The hydrocyanic acid adhering to the surface of the preserved goods can be removed in a manner known per se by simply exposing the same to air.

The following examples serve to illustrate the results obtainable by means of this invention:—

1. 5 kg. of meat were maintained in an excellently fresh condition for 4 to 6 weeks at a temperature below 20° C. in a chamber of 100 litres capacity, into which the total quantity of 120 to 300 mg. of hydrocyanic acid had been introduced at the start.

2. 10 kg. of veal including kidneys and fat were kept in an excellent condition for more than one month at a temperature below 20° C. in a chamber of 100 litres capacity, with the aid of 1000 mg. of hydrocyanic acid, of which 500 mg. were introduced into the preserving chamber at the start and 500 mg. after 3 weeks.

3. 50 kg. of meat, consisting of pieces each weighing a few kg., were stored in a chamber of 100 litres capacity at a temperature below 20° C. By employing in all 2000 mg. of hydrocyanic acid, added at intervals of 8 to 10 days in 4 portions of 500 mg. each (i. e. 10 mg. of hydrocyanic acid per kg. of meat), the goods were maintained for more than 6 weeks in an excellent fresh condition.

4. 5 kg. of meat were kept perfectly fresh for more than 8 weeks at a temperature below 20° C. in a chamber of 20 litres capacity through which air containing 0.008% by volume of hydrocyanic acid was slowly passed.

5. 5 kg. of ripe apricots were stored for 2 months at 8° C. in a 20 litre container charged with 125 mgr. of hydrocyanic acid. At the end of this time the fruit was in an undamaged condition and showed, without being exposed to air for any length of time, a very low content of hydrocyanic acid viz: 0.0004 to 0.0005%.

I claim:

1. Process for preserving animal and vegetable substances with the aid of hydrocyanic acid, consisting in maintaining the substances under treatment continuously during a period of relatively prolonged storage in closed chambers in continuous contact with comparatively small concentrations of hydrocyanic acid, the hydrocyanic acid being from 0.004% to 0.01% by volume in the free portion of the closed space not filled by said substances.

2. Process according to claim 1, characterized by that the hydrocyanic acid is introduced into the storage chamber in partial quantities during the process of preservation.

3. Process according to claim 1, characterized by that a low hydrocyanic acid concentration is continuously maintained in the storage chamber, in such a way that a current of inert gases charged with said relatively small quantities of hydrocyanic acid is passed thru the said storage chamber.

4. Process according to claim 1, characterized by that the process of preservation is carried thru at artificially decreased temperatures.

5. Process according to claim 1, characterized by that a gas current charged with said small quantities of hydrocyanic acid is cooled before its introduction into the storage vessel.

6. Process according to claim 1, characterized by that the substances to be preserved are exposed to the effect of hydrocyanic acid in a closely packed form.

7. Process for preserving meat by means of hydrocyanic acid, consisting in keeping the meat continuously during a period of relatively prolonged storage in closed chambers in a continuous contact with hydrocyanic acid, in such a manner that the hydrocyanic acid concentration in the free portion of the closed space not filled by the meat is maintained during the process between about 0.004 and 0.008% by volume and that, on 1 kg. of meat, more than 20 mg. of hydrocyanic acid are employed for the whole process of preservation.

RICHARD WILLSTÄTTER.